United States Patent [19]

Vondell et al.

[11] Patent Number: 5,499,530
[45] Date of Patent: Mar. 19, 1996

[54] PNEUMATIC TESTER FOR ENGINE OIL PUMPS

[75] Inventors: Edward P. Vondell, Birmingham; Juliana Mobley, Waterford; Jospeh M. Nunez, Warren; Charles A. Maas, Troy; Donald Stuch, Canton; Jinquan Yu, Warren, all of Mich.

[73] Assignee: Chrysler Corporation, Highland Park, Mich.

[21] Appl. No.: 316,766

[22] Filed: Oct. 3, 1994

[51] Int. Cl.⁶ .......................... G01M 3/26; G01M 19/00; F04B 51/00
[52] U.S. Cl. .............................. 73/49.7; 415/118; 417/63; 73/118.1; 73/119 R; 73/168
[58] Field of Search .................... 73/49.7, 118.1, 73/119 R, 168, 865.8; 415/118; 417/63

[56] References Cited

U.S. PATENT DOCUMENTS 4,125,014  11/1978  Candea ..................................... 73/49.7

FOREIGN PATENT DOCUMENTS 369452  12/1992  Japan .
964237  10/1982  U.S.S.R. ................................. 73/168

*Primary Examiner*—Hezron E. Williams
*Assistant Examiner*—Daniel S. Larkin
*Attorney, Agent, or Firm*—Kenneth H. MacLean

[57] ABSTRACT

A pneumatic apparatus to test an engine oil pump of the type designed to be driven by an end of the engine crankshaft. On a test stand, the pump is rotated by a driving mechanism while airflow is generated by the pump itself or while pressurized air is introduced. Air flow characteristics are measured and analyzed to determine acceptability of the pump.

5 Claims, 4 Drawing Sheets

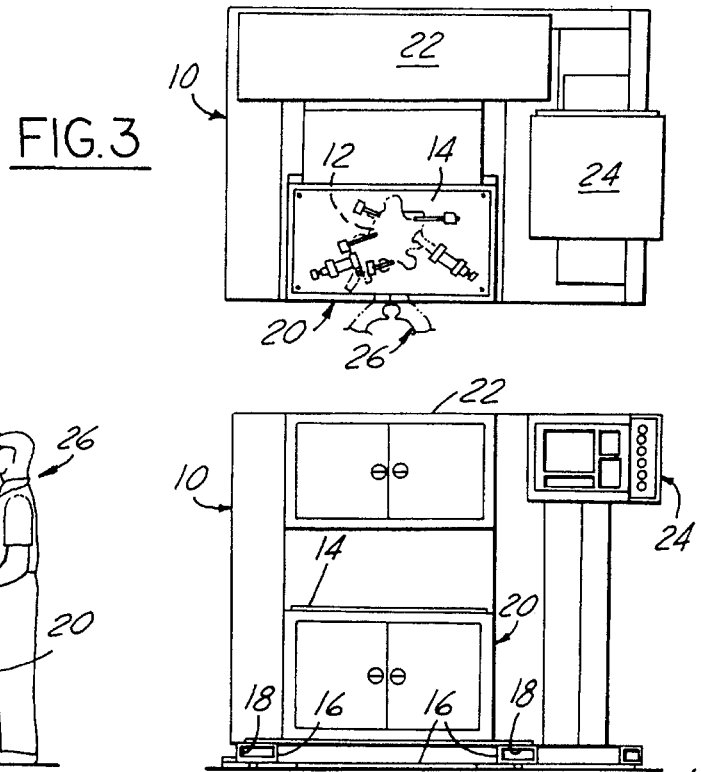
FIG.3
FIG.2
FIG.1
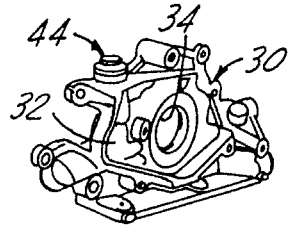
FIG.8A
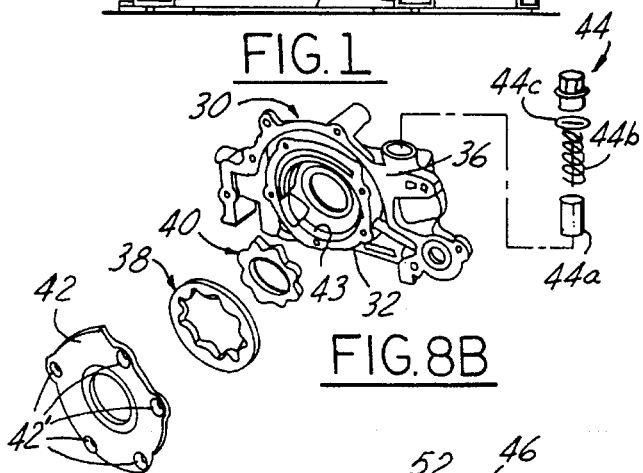
FIG.8B
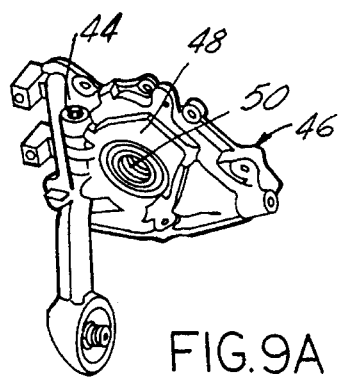
FIG.9A
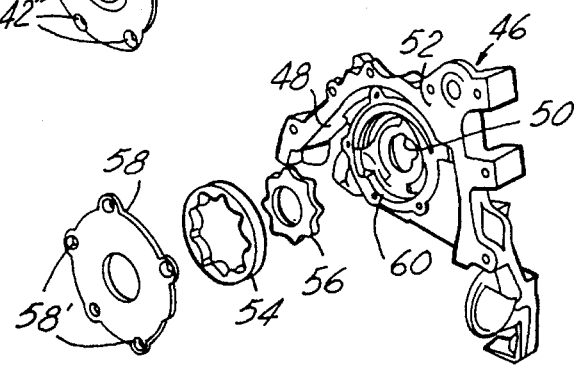
FIG.9B 5,499,530

PNEUMATIC TESTER FOR ENGINE OIL PUMPS

BACKGROUND OF THE INVENTION

1. Field of the Invention

This application concerns a pneumatic apparatus to test an oil pump for an internal combustion engine of the type mounted to the front of the engine and directly driven by the front end of the engine crankshaft. The pump is tested under simulated engine conditions by rotation of the pump and application of pressured air. Resultant air flow characteristics are measured to determine the pump's acceptability based on flow rates.

1. Description of Related Art

Currently oil pumps are tested using actual oil. By this test, characteristics such as flow rate and leakage can be observed. However, testing with actual oil creates a significant "housekeeping" problem as the procedure is messy. Further, a relatively long cycle time is needed to test using oil. Also, the greater investment for equipment and the loss of testing oil with each pump tested, increases testing costs.

The following prior art was uncovered by a pre-examination search.

The U.S. Pat. No. 4,125,014 discloses a test assembly for oil pumps using hydraulic fluid (oil) to test a pump already installed in an engine. This test assembly would prevent some of the problems mentioned above but would identify an unacceptable pump only after installation not before which is desirable.

The foreign patent JA 03-10139(1/991) discloses a test for testing mating of bearing members using a high pressure air feed and measuring the exhaust or outlet pressure.

The U.S. Pat. Nos. 2,671,345 and 3,452,591 disclose testing carburetors and fuel pumps, respectively, using pressurized air rather than liquid.

Other features and advantages of the subject pneumatic oil pump functional test will become more apparent from the following:

SUMMARY OF THE INVENTION

The subject testing apparatus for an oil pump utilizes a machine or apparatus which simulates pump operation on the associated internal combustion engine. During the test, the pump is rotated and low pressure air is introduced to the pump. The flow characteristics of the air into, through, and from the pump are monitored so that acceptable pumps can be identified.

The previously described "housekeeping" problem associated with testing using actual oil is avoided by using air. Further, a relatively short cycle time is needed to test an oil pump using air as opposed to using oil (one half the time). Further, the apparatus using air is much more economically built and operated. Resultantly, the cost per test is decreased (one forth the cost).

Other advantages and features of the subject apparatus and method will be appreciated more apparently after reviewing the drawings of a pneumatic oil test apparatus and reading the following detailed description of it and its operation.

DESCRIPTION OF THE DRAWINGS

FIG. 1 is a frontal elevational view of the pneumatic test apparatus; and

FIG. 2 is a side elevational view of the pneumatic test apparatus; and

FIG. 3 is a top planar view of the pneumatic test apparatus; and

FIG. 8A is a frontal perspective view of the one type of oil pump; and FIG. 8B is a rearward perspective and exploded view of the one type of oil pump; and FIG. 9A is a frontal perspective view of the second type of oil pump; and FIG. 9B is a rearward perspective and exploded view of the second type of oil pump.

DETAILED DESCRIPTION OF AN EMBODIMENT

Figure 4:
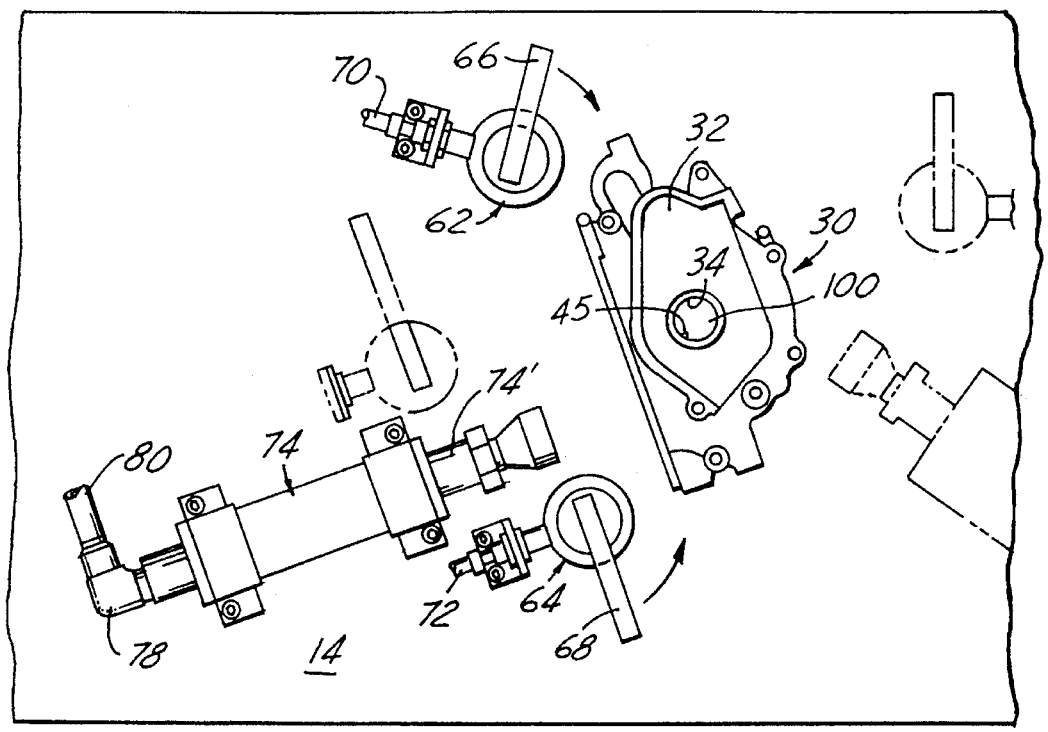
FIG. 4 is an enlarged planar view of the tester's oil pump support table in one operative condition for one type of oil pump.

The subject pneumatic oil pump tester 10 is illustrated in FIGS. 1–3. Specifically, a typical engine oil pump 12 is shown in FIG. 3 resting upon a generally flat, horizontal support table 14 of the tester 10. The entire tester apparatus includes support beams 16 beneath which form a frame or base. The base is designed with openings 18 so that the tongs or forks (not shown) of a fork lift type truck can be inserted to move the apparatus. The apparatus also includes a first (lower) cabinet 20 which supports the table 14 and encloses equipment to be described hereinafter. Cabinet 20 does however enclose a motor having a vertically oriented shaft which extends upwardly through an opening in the support table 14. The end of the shaft engages and rotates the active elements of the oil pump in the same manner as does the end of an engine crankshaft when the pump is mounted on and engine. The tester 10 also has another (upper) cabinet 22 which encloses other components of the testing apparatus. A third cabinet or enclosure 24 houses test indication means (gages, etc.) and control devices (on/off switch, for example). The cabinet 20, 22, and 24 are arranged for ease of access a human tester 26, ie., cabinet 20 is directly in front tester 6 and presents table 14 at about waist height, cabinet 2 is in front of tester 26 at about eye level, and cabinet 24 is to the right side of tester 26 at about eye level.

FIRST TYPE OF OIL PUMP

Figure 5:
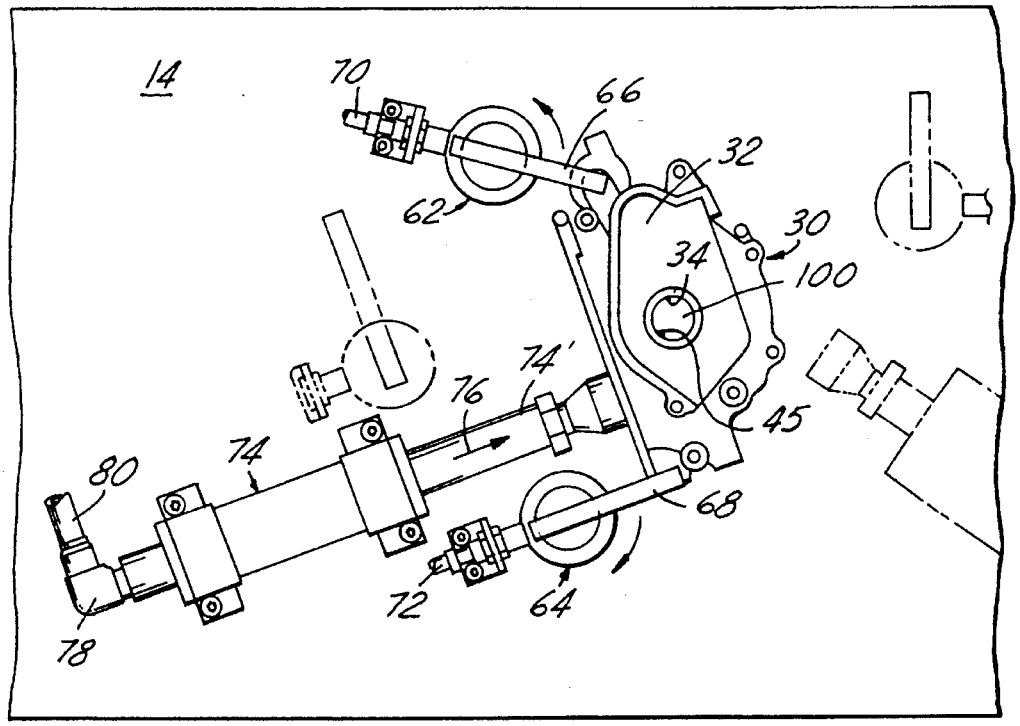
FIG. 5 is a view like in FIG. 4 but with the tester in a second operative condition.

The configuration of a first oil pump 30 is illustrated lying upon table 14 in the enlarged FIGS. 4 and 5. Pump 30 represents the actual oil pump configuration as currently available with the 2.0 L four cylinder engine which powers the Neon available from the Chrysler Corporation. The pump 30 itself is perhaps best disclosed in FIGS. 8A and 8B. In FIG. 8A, a body 32 of the pump 30 reveals a central opening 34. When the pump 30 is mounted to an engine, the end of an engine crankshaft extends through the opening 34. In FIG. 8B, the rearward surface 36 of the pump body 32 is shown. When assembled to an engine, surface 36 is adapted to engage mating portions (not shown) of an engine block. When used with the tester 10, this surface 36 rests upon the surface of support table 14. The active inner parts of the pump 30 are shown in FIG. 8B but are separated for clarity. These include: an outer gear 38; an inner gear 40; and a cover 42. Several fasteners (not illustrated) secure the cover 42 to the body 32 and would normally extend through openings 42' in the cover and thread into openings visible in the body 32.

The body 32 has a counterbore 43 in which the outer gear 38 is mounted and in which it is free to rotate. The inner gear 40 has a central opening through which the engine crankshaft normally extends. Although not visible on the scale of FIG. 8B but shown in FIGS. 4–5, the opening has at least one small spine or projection 45 which is engaged by a similar configuration or flats of the engine crankshaft to cause rotation of the gear 40 with the crankshaft. Also as is evident from FIG. 8B, the inner gear 40 has a toothed outer periphery. Likewise, the bore in the outer gear 38 has a similarly toothed configuration. Note however that the inner gear 40 has one less tooth than outer gear 38. Resultantly, as the inner gear 40 is rotated, the outer gear 38 is caused to rotate in the counterbore 43. As is well known in the pump art, the resultant variable volume cavities formed between the gears 38, 40 creates pumping chambers.

FIG. 8A shows the outer member or cap 44 of a pressure relief assembly which regulates the pump's oil pressure output. As shown in FIG. 8B, the relief valve assembly includes a valve member 44a, spring 44b, and gasket 44c. As oil pressure increases, the valve member 45a moves against spring 45b to return some oil to the inlet or suction side of the pump through an internal passage (not visible). When the pump is operated, the oil pressure causes the relief valve 44a to open and close which regulates pump's output pressure as desired. This results in maintaining a desired operating range, ie., 55–75 psi.

SECOND TYPE OF OIL PUMP

Figure 6:
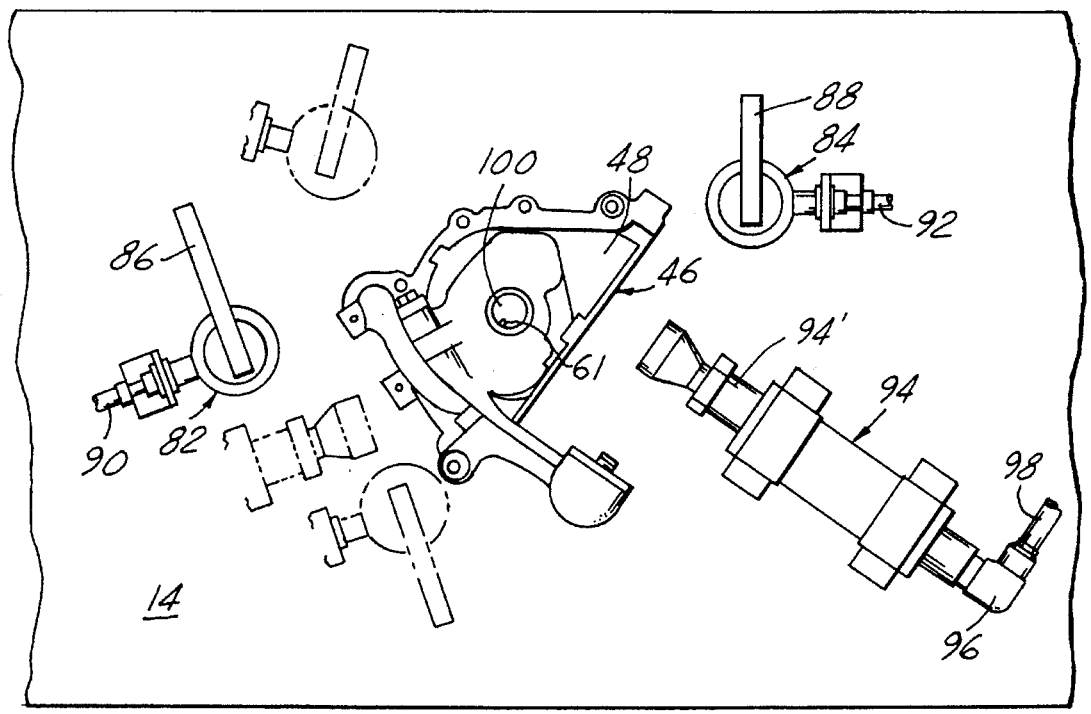
FIG. 6, like FIG. 4, is an enlarged planar view of the tester's oil pump support table in one operative condition but for a second type of oil pump.
Figure 7:
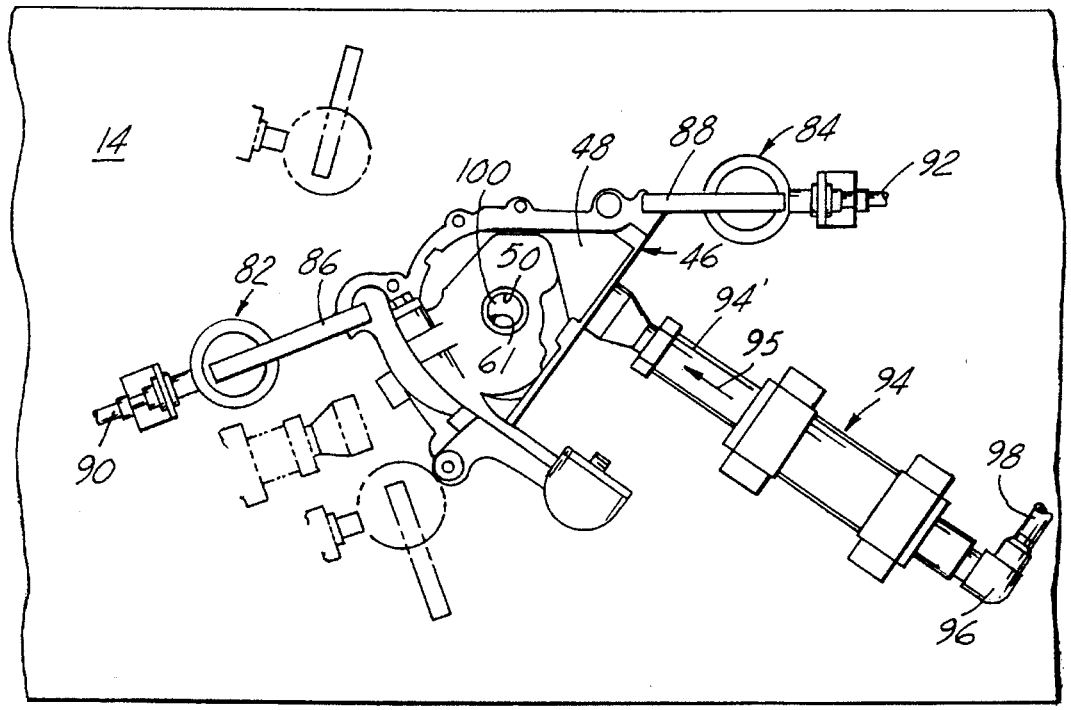
FIG. 7, like FIG. 5, is a view of the tester support table in a second operative condition for the second type of oil pump.

In the enlarged FIGS. 6 and 7, the configuration of a second oil pump 46 is shown supported upon table 14. The pump 46 itself is perhaps best disclosed in FIGS. 9A and 9B. In FIG. 9A, a body 48 of the pump 46 reveals a central opening 50. When the pump is mounted to an engine, the end of an engine crankshaft extends through the opening 50. In FIG. 9B, the rearward surface 52 of the pump body 48 is shown. When assembled to an engine, surface 52 is adapted to engage mating portions (not shown) of an engine block. When used with the tester 10, this surface 52 rests upon surface of support table 14. The active inner parts of the pump 46 are shown in FIG. 9B but are separated for clarity. These include: an outer gear 54, an inner gear 56 and a cover 58. Several fasteners (not illustrated) secure the cover 58 to the body 48 and would normally extend through openings 58' in the cover and thread into openings visible in the body 48.

The body 48 has a counterbore 60 in which the outer gear 54 is mounted and in which it is free to rotate. The inner gear 56 has a central opening through which the engine crankshaft normally extends. Although not visible on the scale of FIG. 8B but shown in FIGS. 6–7, the bore of the inner gear 56 has at least one small spine or projection 61 which is engaged by a similar configuration of the engine crankshaft to cause rotation of the gear 40 with the crankshaft. Also as is evident from FIG. 8B, the inner gear 56 has a toothed outer periphery. Likewise, the bore of the outer gear 54 has a similarly toothed configuration. Note however that the inner gear 56 has one less tooth than the outer gear 54. Resultantly, as the inner gear 56 is rotated, the outer gear 54 is caused to rotate in the counterbore 60. As is well known in the pump art, the resultant variable volume cavities formed between the gears 54, 56 creates pumping chambers.

Like the pump 30, pump 46 includes a pressure relief valve assembly of which only the end cap 44 is visible in FIG. 9A. The relief valve assembly is identical to the valve assembly shown in FIG. 8B and described above.

TESTING WITH THE FIRST TYPE OF OIL PUMP

Referring back to FIG. 4, the oil pump 30 is illustrated resting upon table 14 prior to testing. The pump 30 is shown in a secured or clamped condition against table 14 in FIG. 5. A pair of clamp assemblies 62, 64 are selectively energized by means of conduits 70, 72, respectively to secure the pump body 32 to the table 14. Specifically, the clamp assemblies 62, 64 have pivotal arm portions 66, 68 which contact the pump to secure it against the table 14. The outward ends of the arms 66, 68 engage selected locations on the pump body 32. The clamps exert a downward force on the pump toward the table 14 to secure the pump 30 against the surface of the table 14.

After the oil pump 30 is clamped, a selectively alternate air inlet or outlet flow device 74 with an axially extendable tube portion 74' is moved from a normally retracted position shown in FIG. 4 in a direction 76 to an active extended position shown in FIG. 5. In this extended position, the air tube 74' sealingly engages the body 32 of the pump at a location aligned with the pump's opening. At an opposite end of the inlet device 74, a fitting 78 and a hose 80 is used alternately as an inlet for pressurized air, an exhaust for air and for selectively sealing the pump inlet.

The pump 30 for the 2.0 L engine has a pressure relief valve located upstream from its outlet port. This relief valve establishes a desirable pressure output level. The relief valve regulates or establishes a preselected desirable pressure output level. The subject pneumatic tester harmlessly discharges air from the inlet of the pump 30, unlike the previously used pressurized oil type tester. With the pressurized oil tester, oil discharging from a pump had to be prevent from leaking out of the test circuit and had to be collected for reuse.

TESTING WITH THE SECOND TYPE OF OIL PUMP

Referring now back to FIG. 6, the second oil pump configuration 46 is illustrated resting upon table 14 prior to testing and before being secured or clamped against the table 14. In FIG. 7, the same pump 46 is illustrated but after it is clamped against the table 14 by a pair of pneumatic clamps 82, 84 which are selectively energized by means of conduits 90, 92 respectively. Specifically, clamps 82, 84 have pivotal arm portions 86, 88. The outward ends of arm portions 86, 88 are moved to engage selected edge locations of the pump body 48. The clamps exert a downward force on the pump toward the table 14 to secure the pump 30 against the surface of the table 14.

After oil pump 46 is clamped per the above explanation, a selectivley alternate air inlet or outlet flow device 94 with an axially extendable tube 94' is moved from its normally retracted position shown in FIG. 6 in a direction 96 to an active extended position shown in FIG. 7. In this extended position, the tube 94' sealingly engages the body 48 of the pump 46 at a location aligned with the pump's opening. At an opposite end of the inlet device 94, a fitting 96 and a hose 98 is used alternately as an inlet for pressurized air, an exhaust for air and for selectively sealing the pump inlet.

Pump 46 will be introduced and available on selected Chrysler vehicles in the early part of 1995. It will be available on a 2.4 L four cylinder engine with dual overhead camshafts. Like pump 30 for the 2.0 L engine, the pump 46 has a pressure relief valve located upstream from its outlet port. This valve establishes a desirable pressure output level. The subject pneumatic tester harmlessly discharges air from the inlet of the pump 46, unlike the previously used pressurized oil type tester. With the pressurized oil tester, oil discharging from a pump had to be prevent from leaking out of the test circuit and had to be collected for reuse.

The tester 10 has an electric motor with a vertically oriented shaft which extends upward through the table 14 and through the opening 34 of pump 30 or through the opening 50 of pump 46. In FIGS. 4–7, the upper end portion 100 of the motor shaft is visible. The shaft 100 is used to test a pump for acceptable torque characteristics and to generate airflow which is measured from the discharge side of the pump.

TEST OPERATIONS

Introduction

Figure 10:
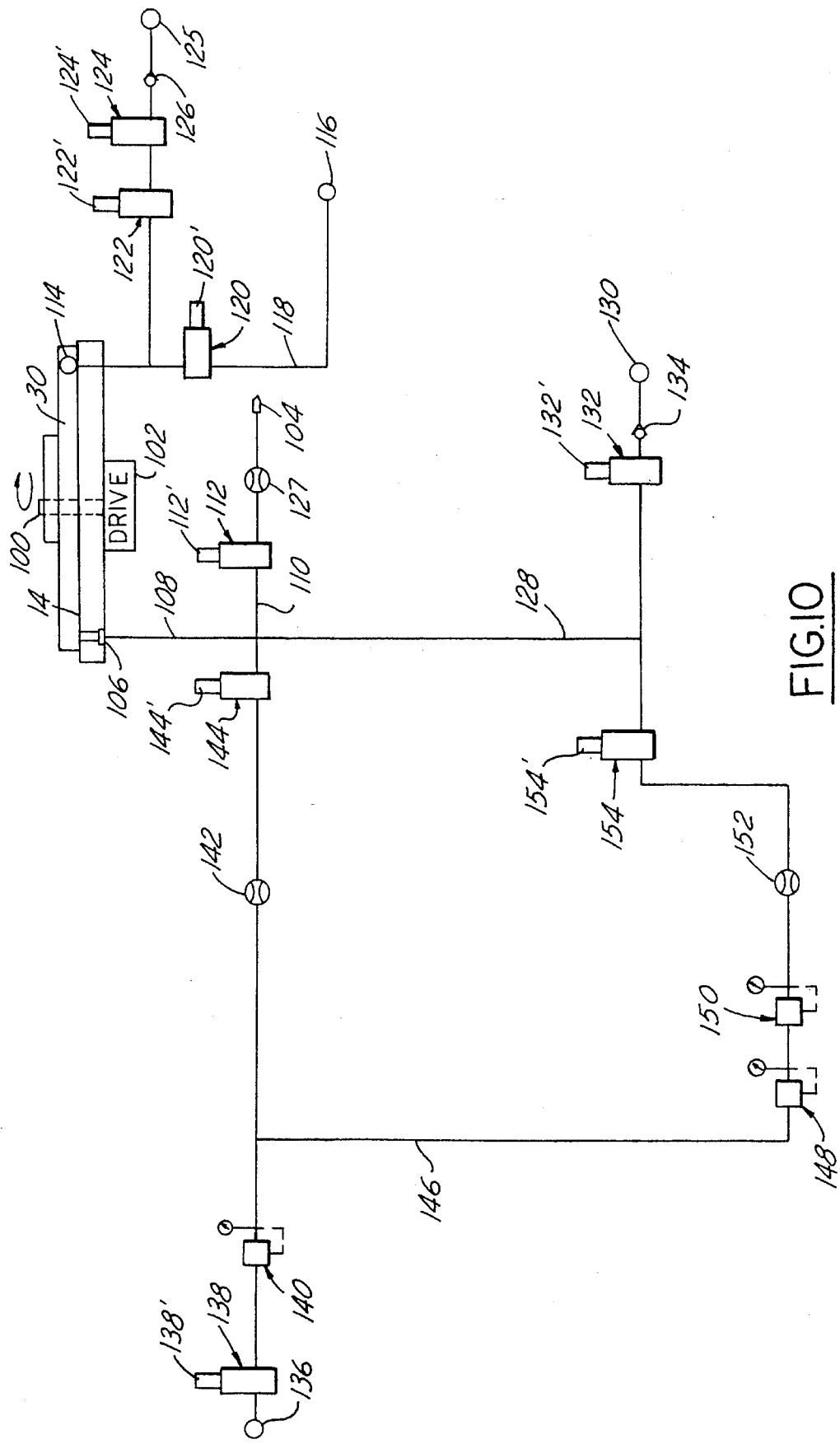
FIG. 10 is a somewhat schematic view of the operative controls for the air flow test system of the pneumatic tester.

The tester 10 basically provides a mechanical turning apparatus to rotate a pump and a controlled pneumatic circuit as shown in FIG. 10 to simulate pump operation but using pressurized air instead of oil and analyzing resultant air flow conditions to determine the characteristics of the pump. The tester is used to check: for acceptable torque characteristics; for suction flow conditions; for the operation of the pressure relief valve; for leakage; and rotor clearance.

Torque Test

A first test determines whether the pump is assembled and fitted so that acceptability low torque specifications are met. The pump 30 is rotated by electric motor drive 102 at a preset speed with the pump outlet 106 open and inlet 114 sealed closed. For example, the motor will rotate each pump eleven rotations at 190–200 rpms. The motor drive 102 is capable of measuring and indicating the torque required to drive the pump. For example, acceptable maximum torque requirements to drive the pump might be established at less than 2 in-lbs.

Suction Flow Testing

Another or second test evaluates the suction and outlet flow characteristics of the pump. While the pump is rotated during the torque test at 190–200 rpms, a positive airflow is generated by the rotors and measured by flowmeter 127. Conduits 108, 110 and a valving device 112 connect flowmeter 127 with the pump's outlet port 106. The resultant flow pump outlet 106, through conduits 108, 110, valuing device 112, and flowmeter 127 passes to fitting 104 and then to the atmosphere. The valving device 112 is controlled by an electrical solenoid portion 112'. Also during this test, the pump's inlet 114 is closed to the system's exhaust system 116. Specifically, flow through conduit 118 is blocked by a closed valving device 120 which is controlled by a solenoid portion 120'. Other valving devices 122, 124 controlled by solenoid portions 122', 124' are opened during this test so as to connect pump inlet 114 to a suction pressure transducer 125. A check valve 126 prevents the flow of air in a rightward reverse direction. By this means, acceptable or unacceptable flow characteristics are revealed.

Pressure Relief Valve Operation

A third test of the pump 30 determines the acceptability of the pump's pressure relief valve which is located upstream of the pump outlet. While rotating the pump at say 72 rpms, the pump inlet 114 is connected by an opened valving device 120 to the air exhaust 116. The pump outlet 106 is connected by conduits 108, 128 and by an opened valving device 132 to a relief valve/leakage pressure transducer 130. The valving device 132 is opened and closed as controlled by activation of a solenoid portion 132'. A check valve 134 prevents flow in a rightward reverse direction. Outlet 106 is also fluidly connected to a main source of pressurized air 136 through an open valving device 138, a pressure regulator 140, a relief valve flowmeter 142, an opened valving device 144, and conduit 108. The valving devices 138 and 144 are controlled by solenoid portions 138' and by 144'. The pressurized air source 136 may, for example, provide an air supply of 60 scfm (specific cubic feet per minute) at 80 psig. The regulator 140 maintains the air pressure at 80 psig.

Outlet Port Leakage

A fourth test determines acceptable leakage rates. While rotating the pump at say, 72 rpms, the inlet 114 is connected by an opened valving device 120 and conduit 118 to the exhaust system 116. The outlet port 106 is connected to the source 136 of pressurized air through: conduit 128; opened valve 154; air flowmeter 152; pressure regulators 150 and 148; conduit 146; pressure regulator 140; and an opened valving device 138. However, the valving device 144 is closed and the circuit extends from regulator 140 through a pair of pressure and flow regulating devices 148, 150 to a leakage indicating flowmeter 152. This circuit is controlled by opening a valving device 154 as controlled by its solenoid portion 154'. Finally, conduits 128, 108 completes the fluid connection to outlet port 106. Also, valving device 132 is closed during this test. The flow characteristics reveal acceptable or unacceptable rotor clearance and internal leakage.

Although only one embodiment of the pneumatic oil pump tester has been illustrated and described above in detail, other embodiments and modifications are contemplated which would still fall within the scope of the following claims which define the invention.

What is claimed:

1. Apparatus for testing an engine oil pump having a generally planar surface, an inlet, and an outlet, comprising: table means defining a substantially horizontal surface for supporting the planar surface of the pump; means to selectively engage the pump and exert a clamping force thereon for securing the pump upon the support table; a fitting for selectively mating with the pump inlet; source means for pressurized air connected to said pump to selectively induce an air flow in the pump; means for measuring air flows to and from the pump whereby characteristics of the flow are indicative of pump conditions.

2. Apparatus for testing an engine oil pump of the type having a generally planar surface, an inlet, an outlet, and an opening normally adapted for receiving the end of an engine's crankshaft for rotating the pump, a pneumatic testing apparatus, comprising: generally horizontal table means to support the planar surface of the pump thereon; selective clamping means for securing the pump at a desirable location upon the table; source means for pressurized air connected to said pump to selectively induce an air flow in the pump including fitting means mating with the pump's inlet and outlet; means to measure air flows to and from the pump whereby flow characteristics are indicative of pump condition.

3. The apparatus set forth in claim 2 further comprising a driving mechanism including a shaft extending through the opening in the pump for producing rotative operation of the pump simulating the pump's operation when attached to an operative engine.

4. The apparatus set forth on claim 3 further comprising: an air receiving exhaust connected to the pump's inlet; the source of pressurized air connected to the pump's outlet; a flowmeter device upstream of the pump's outlet to measure air flow into the pump through its outlet.

5. An apparatus for pneumatic testing an engine oil pump of the type having a generally planar surface, an inlet, an outlet, a pressure relief valve mechanism upstream of the pump outlet, and an opening normally adapted for receiving the end of an engine's crankshaft for rotating the pump, a pneumatic testing apparatus, comprising: generally horizontal table means to support the planar surface of the pump thereon; selective clamping means for securing the pump at a desirable location upon the table; first air flow means for connection with the inlet of said pump and second air flow means for connection with the outlet of said pump; source means for pressurized air selectively connected to said pump's outlet through said second air flow means to induce an air flow into the pump and in opposition to the normal flow direction past said pressure relief valve; an air receiving exhaust selectively connected to the pump's inlet through said first air flow means; flowmeter means between the air pressure source and the pump's outlet to measure air flows to the pump whereby flow characteristics are indicative of pump and relief valve condition.

* * * * *